Patented June 18, 1946

2,402,192

UNITED STATES PATENT OFFICE 2,402,192

PROCESS FOR THE PRODUCTION OF AMMONIUM NITRATE

Lloyd Williams, Leonard F. Wright, and Robert Hendricks, Calgary, Alberta, Canada, assignors to The Consolidated Mining and Smelting Company of Canada, Limited, Montreal, Quebec, Canada, a company of Canada Application December 17, 1943, Serial No. 514,610

8 Claims. (Cl. 23—103)

This invention relates to the production of ammonium nitrate in granular form, suitable for use as a fertilizer, from a concentrated ammonium nitrate solution, and is particularly directed to providing a process for the production of ammonium nitrate in a form which, when suitably conditioned with the usual coating and dusting agents, will not readily cake when bagged and stored and which is suitable for use in mixing and for direct application to the soil, the granules being in the form of spherical-like globules or prills having a low moisture content and characterized by their strong, hard physical structure.

Ammonium nitrate has particularly desirable chemical properties for use as a fertilizer in that the nitrogen content is high and the salt is highly soluble. Heretofore, however, the demand for ammonium nitrate for use as a fertilizer has been greatly restricted due to the marked tendency of the salt particles to merge together when stored, thereby tending to form a dense, hard cake, in which form it cannot be applied conveniently to the soil. This tendency to cake and harden is due in part to the natural hygroscopic properties of the salt and in part to the movement of moisture from the interior of the individual crystals to the surfaces resulting in the dissolution of the crystals at their points of contact. On redistribution of the moisture in this manner, the individual crystals tend to merge together in the form of a dense, hard cake. Various expedients have been adapted in attempts to overcome this caking tendency but without appreciable success. For example, ammonium nitrate crystals have been mixed and coated with other compounds such as limestone, gypsum, siliceous materials and phosphate, in finely divided form. Also, waxes have been used to coat the individual particles but while they are satisfactory in some respects, their use is accompanied by certain attendant disadvantages.

We have found that ammonium nitrate can be produced in an improved granular form in which hygroscopicity is greatly reduced, in which the granules are free flowing, strong, dense and hard, and which are of a relatively uniform size. We have found further that ammonium nitrate granules having these properties have a greatly reduced tendency to cake and harden even when stored for long periods of time and are ideally adapted for application to the soil.

One of the primary objects of the present invention is to produce crystalline ammonium nitrate from a concentrated aqueous ammonium nitrate solution in which the ammonium nitrate particles are in the form of individual, spherical-like globules or prills, substantially free from moisture, and possessed of a hard, strong physical structure capable of exposure to the air for a relatively long period of time before deliquescence impairs their usefulness.

A further object of the invention is to provide a process which is effective for producing crystalline ammonium nitrate having uniform chemical and physical characteristics on a commercial scale and at a relatively low cost.

An understanding of the manner in which the objects of the present invention are attained may be had from the following description, reference being made to the accompanying drawings in which.

Figure 1:
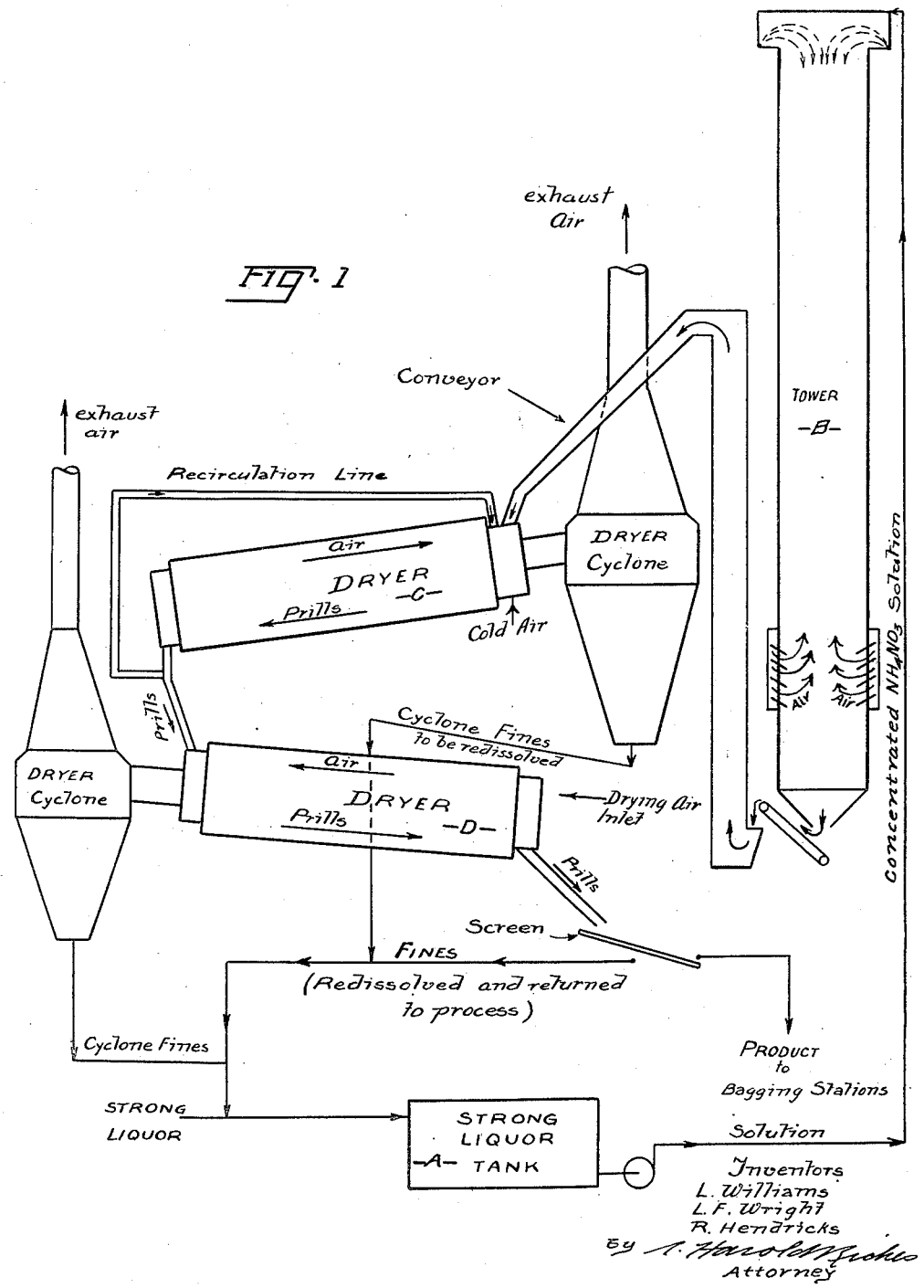
Figure 1 is a flow sheet illustrating the several steps of the process.
Figure 2:
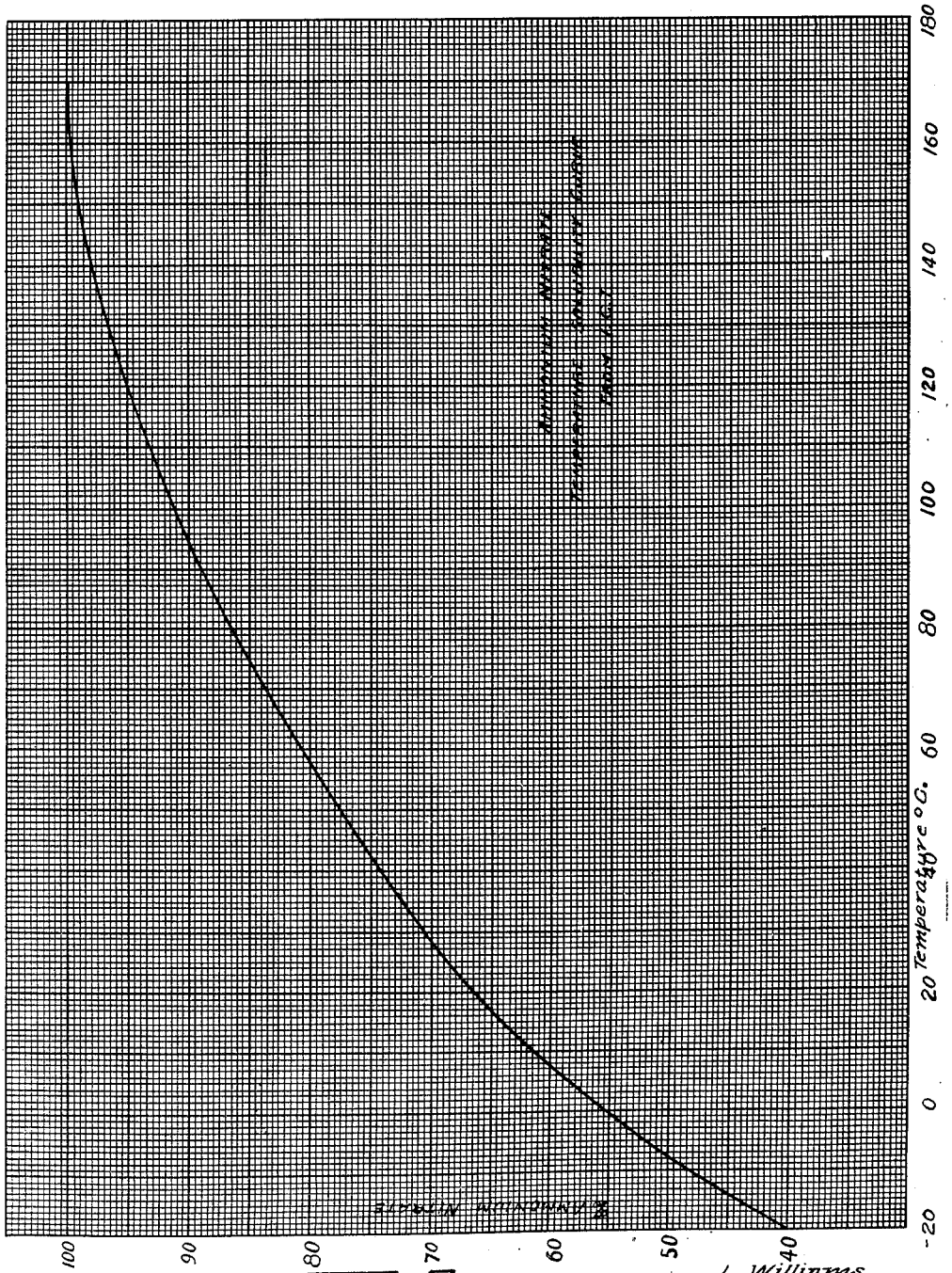
Figure 2 is a graph illustrating the ammonium nitrate solubility curve.

It will be understood that while the process of the present invention is described in detail as being applied to the production of crystalline ammonium nitrate from a concentrated aqueous ammonium nitrate solution, the process may be applied to the production of other salts having solubilities similar to that of ammonium nitrate, such as urea and mixtures of ammonium nitrate and ammonium phosphate.

The process of the present invention involves, in general, the steps of spraying, at a temperature above its crystallizing or saturation temperature, a concentrated, aqueous ammonium nitrate solution, into a gaseous cooling medium maintained at a lower temperature, whereby the outer surface of each individual droplet is suddenly chilled and solidifies in the form of a shell, cooling the granules to a temperature below 84° C. in the gaseous cooling medium, removing the granules from the spraying step of the process and drying the granules in a heated gaseous drying medium to remove the major portion of the moisture content of the granules, and thereafter cooling and drying the granules in a cooler gaseous drying medium to reduce the moisture content to less than 0.5%.

We have found that a product having satisfactory physical properties is obtained by employing, as a feed solution to the spray cooling step, a concentrated ammonium nitrate solution having an ammonium nitrate content such that the saturation temperature of the solution is within the range of from 115° C. to 135° C. The corresponding range of salt concentration is from about 94% to about 97% ammonium nitrate.

We have found that if a less concentrated solution is used the moisture cannot readily be extracted from the cores of the prills without causing deterioration of the shells formed in the spraying step, while prills formed from a more highly concentrated solution contain a large central void which makes them less satisfactory for use as a fertilizer due to their lower crushing strength. The ammonium nitrate solution is made up to the desired degree of concentration by known methods and passed to the storage tank A from which it is pumped to the spray tower B under sufficient pressure to provide a pressure of the order of about ten pounds per square inch at the spray nozzles.

The feed solution to the spray tower is preheated to a temperature sufficiently above the saturation temperature of the solution to ensure the formation of roughly spherical or globular droplets. The lower limit of the temperature of the sprayed solution is chosen so that the difference between the temperature of the sprayed solution and its saturation temperature is within narrow limits dependent upon the difference between the temperature of the sprayed solution and the temperature of the cooling medium. For example, using air at atmospheric temperature, the solution must be sprayed at a temperature at least five centigrade degrees above its saturation temperature. If it is sprayed at a lower temperature, the particles of the dispersed solution tend to solidify before they have had an opportunity of assuming the roughly spherical shape of the prills of the present invention. Instead, they tend to solidify in an elongated or bean-like shape which breaks down in the subsequent drying step of the process, thereby causing the formation of a high percentage of fines. The presence of appreciable amounts of fines in the resulting product increases the tendency of the product as a whole to cake and harden in storage. In using a cooling medium of substantially higher temperature, the solution can be sprayed at slightly lower temperatures and still form roughly spherical droplets.

The upper temperature limit at which the solution may be sprayed into the tower is determined by the effective height of the tower having regard to the velocity and temperature of the cooling medium. It is necessary that the individual droplets or prills, in falling through the tower, have time to solidify sufficiently to form the strong outer shells which permit the prills to retain their individual entities when in contact at the base of the tower. If the temperature at which the solution is sprayed is too high above the saturation temperature for any given set of spraying conditions, the outer shells would not have time to form and the droplets collecting in the base of the tower would form a pasty mass. In continuous operation of the process using a tower having a free fall of fifty-five feet, it is found that a very satisfactory product is obtained when the solution is preheated to within from five centigrade degrees to ten centigrade degrees above its saturation temperature when using air at about atmospheric temperature and moving upwardly in the tower at about three feet per second as the gaseous cooling medium.

The solution is preferably sprayed upwardly into the tower at an angle of about 45° to the horizontal through a series of nozzles spaced around the inner periphery of the upper portion of the tower. The nozzles are also preferably designed to impart a whirling motion to the stream of solution projected therethrough so that the spray is ejected from each nozzle in the form of a narrow, rotating cone of solution which impinges tangentially on the stream of air, preferably at about atmospheric temperature, flowing upwardly from the base of the tower in counter-current to the fall of the prills. The size of the individual droplets is determined by the degree of dispersion of the stream of solution ejected from the nozzles which, in turn, is determined by the solution pressure and the size of the openings in the nozzles. The nozzle openings and solution pressure can be readily predetermined to produce a product within desired size limits. Troughs are preferably placed directly underneath the nozzles to catch any drippings from the nozzles which would otherwise contaminate the product collected in the base of the tower. The nozzles are spaced, of course, so that there is very little, if any, impingement of the solution on the walls of the tower.

In the operation of the spray cooling step of the process under the described conditions, the individual prills are formed by the method of spraying the solution in the form of spherical-like droplets of a size determined by the degree of dispersion of the solution. The outer surfaces of the droplets solidify almost immediately upon contact with the gaseous cooling medium, the crystallization and hardening proceeding as the particles fall through the tower.

Each prill, as it falls freely through the tower in counter-current to a stream of gaseous cooling medium flowing upwardly from the base of the tower, becomes protected by a shell of fine crystalline material. This shell encloses a core which contains solution, or a mixture of solution and solids, at a temperature which is higher than that of the shell. The gaseous cooling medium, preferably having a low moisture content and at about atmospheric temperature, is introduced into the base of the tower. The velocity of the gaseous cooling medium in rising through the tower is such that substantially all the prills settle to the bottom of the tower in a short period of time. It is found that when using air for this purpose a suitable rate of flow of the air is of the order of about three feet per second, under which conditions only a very small proportion of fines is entrained with the air passing out of the tower. The spraying step of the process is essentially a cooling operation. For reasons pointed out in detail hereinafter, it is not desired to dry the prills to any appreciable extent in the spray tower.

In a specific embodiment of the spray-cooling step of the process, using two oppositely positioned rows of nozzles, each row containing ten nozzles, and each nozzle opening being $\frac{3}{32}$ inch internal diameter, in a tower 20 feet by 20 feet, and having an effective height of 55 feet, a production of about 150 tons of prills per 24 hours is obtained. Using a nozzle opening of the size specified, the size of the product is such that about 94% will pass through a 4 mesh Tyler screen and be retained on a 28 mesh screen.

The apparatus involved in the spray-cooling step of the process includes steam-jacketed pipe lines and nozzles made of stainless steel or other material resistant to the corrosive and erosive action of the solution. Each nozzle is preferably designed to eject the solution in the form of a hollow, rotating cone of liquid. The tower is lined with water-proof material and is preferably provided with a hopper-shaped base to facilitate the discharge of the prills settling therein.

The air is injected into the base of the tower, preferably through openings or louvres spaced therearound slightly above the hopper-like base, to rise upwardly in the tower at a velocity of about three feet per second. The air is preferably of low moisture content and is at about atmospheric temperature. The solution leaving the sprays contains from about 6% to about 3% moisture, preferably from about 5% to about 4%, according to the preferred ammonium nitrate concentration range corresponding to saturation temperatures of from 120° C. to 125° C. Very little of this moisture, less than 1%, is removed from the prills during their brief passage through the tower. During their passage through the tower, the prills are cooled from the initial spraying temperature to a temperature below the 84° C. transition temperature.

Under the described operating conditions, the prills collecting in the base of the tower are in a roughly spherical form having a moisture content of from about 5% to about 2% and are at a temperature below 84° C. The bulk of the moisture in these prills is contained within the cores and if the prills were permitted to accumulate in the base of the tower for any appreciable length of time, the moisture would diffuse from the core through the shell causing deterioration of the shell and the conversion of the individual prills into a pasty mass. The prills, therefore, are conveyed as quickly as possible, for example, within fifteen seconds, to the initial drying stage.

We have found that the extraction of the moisture from the cores of the prills constitutes one of the critical steps of the process having regard to the physical characteristics required in the resulting product.

As cooling progresses, the fluid cools yielding ammonium nitrate crystals with saturated mother-liquor confined between the interfaces of these crystals in the core. The solution is uniformly dispersed around the crystal boundaries in the core and, therefore, the moisture, on being withdrawn during drying, leaves a dense, apparently solid granule containing a plurality of minute pores and which may contain a relatively small internal void space, but which is not as hollow as would be the case if the prills were formed by spraying solutions having saturation temperatures exceeding 135° C.

We have found that substantially all the moisture must be extracted from the core of each prill and any residual moisture must be evenly distributed throughout the entire prill, otherwise, in the storage of the product, moisture contained in the cores would tend to diffuse outwardly to cause deterioration of the prills and merging of the individual prills into a dense, hard cake which would require further processing before it could be applied to the soil. We have found that, in order to avoid deterioration of the structure of the hard, outer shells in the drying step, the bulk of the moisture must be extracted from the cores continuously, the temperature being progressively increased as the moisture content is reduced, during which operation the moisture content is lowered to less than 0.5% and preferably to less than 0.2%.

We have found further that if prills, containing a high percentage of moisture, say 4%, are dried rapidly at a high temperature, say above 50° C., there is a marked tendency for the outer shell to break down or disintegrate. This may be due to the relatively large volume of moisture passing slowly through the previously crystallized outer shell causing resolution thereof.

The problem of extracting the moisture from the cores of the prills of this hygroscopic and highly soluble material without deterioration of the structure of the hard outer shell formed in the spraying step of the process may be solved by following one or other of the following drying procedures.

The prills are received from the spray tower at a temperature below 84° C. and usually within the range of from 50° C. to 80° C., and have a moisture content from about 5% to about 2%, that is, about 1% less than the moisture content of the aqueous concentrated solution sprayed into the tower. While the spraying step is essentially a cooling operation, a small amount of moisture is extracted from the prills as they pass through the tower.

The prills collecting in the base of the tower are fed as quickly as possible to the first drier wherein they are passed countercurrently to a gaseous drying medium. The temperature to which the prills are heated in the initial drying stage is dependent upon their original moisture content. For example, we have found that prills having a moisture content of about 4% cannot be heated to a temperature above 50° C. without deterioration of the structure of the prills, while prills having a moisture content of about 2% can be heated to a temperature of about 70° C. without deterioration of the prill structure. The drying operation is conducted, therefore, to heat the prills to the maximum temperature permitted by the moisture content.

During their passage through the initial drying stage, the prills are heated to a temperature ranging from 50° C. to 70° C. as the moisture content of the prills is reduced from 4% to 2% and maintained at a temperature of about 70° C. until the moisture content has been reduced to about 1% or preferably to about 0.5%.

When the moisture content has been reduced to about 1.0%, the prills can be heated to and maintained at a temperature of about 80° C. for a period of time sufficient to reduce the moisture content finally to about 0.5% or less and then be permitted to cool to atmospheric temperature. It has been found, however, that prills having a moisture content of 0.5% or less, which have been cooled without good air contact, become very tacky and sticky due to the migration of moisture from the cores to the shells of the prills. It is necessary, therefore, to cool and dry the prills in intimate contact with a cooler gaseous drying medium. This can be accomplished very satisfactorily by conducting the final stage of drying as a cooling operation, employing air at ordinary atmospheric temperature, such as from 20° C. to 30° C., countercurrently to the movement of the prills, whereby the moisture content of the prills is reduced to 0.5% or less and their temperature is reduced to that of the atmosphere.

However, we have found that if, during the initial drying step the prills are heated to a temperature above 70° C., the drying rate in the subsequent cooling step is materially reduced.

The drying operation can be conducted in one or more rotary driers of standard design. In the modification illustrated herein, two rotary driers C and D are shown, each drier being provided with parallel vanes extending the length of the drier. These vanes serve to lift the prills and drop them during their passage through the rotating driers whereby the prills are maintained in intimate contact with the drying air flowing countercurrently to the movement of the prills.

We have found in removing the moisture content of the prills that there is a marked increase in the strength of the individual prills when the moisture content has been reduced to 2% or less, provided that the drying has been effected without deterioration of the prill structure. We have found further that the drying of the prills can be greatly facilitated by adding to the wet prills from the spraying tower as they are fed into the initial drying stage, a portion of the dried prills recirculated from the drying stage. When a portion of the dried prills is added to the stream of the wet prills fed into the drying stage, there is a diffusion of moisture from the wet salt to the dry salt, the mass of the prills tending to reach a state of equilibrium with respect to moisture content. It is therefore preferred to recirculate an amount of dried prills sufficient to produce in the feed to the initial drying stage, an average moisture content of about 2% or less. For example, if the wet prills have a moisture content of about 4%, a feed to the drying stage consisting of about 50% wet prills and 50% dried prills results in a feed to the drying stage having about 2% moisture content. Such a feed can be heated to and maintained at a temperature of approximately 70° C. without deterioration of the prill structure and the moisture content of the mass can be reduced to 0.5% or less. It is also preferred, in this modification of the drying stage, as in the previously described modification, to complete the drying of the prills by cooling them from a temperature of approximately 70° C. to about atmospheric temperature while passing them countercurrently to a cooler gaseous drying medium whereby the moisture content is preferably reduced to less than 0.2% evenly distributed throughout the individual prills.

As a specific example of the process described herein, an aqueous ammonium nitrate solution is concentrated until its saturation temperature is preferably within the range of from 120° C. to 125° C.

This solution is sprayed upwardly from the upper part of a tower at a temperature at least five centigrade degrees above its saturation temperature, into a gaseous cooling medium introduced into the tower at about atmospheric temperature. The prills formed in the spraying step, containing about 4% moisture, are mixed with about an equal amount of dried prills to produce a feed to the drier having a moisture content of about 2%. The prills are passed continuously and as quickly as possible to the initial drying stage wherein they are heated to a temperature of about 70° C. during their passage countercurrently to a stream of heated drying air. During their passage through the first drier, the moisture content is reduced to about 1% and preferably to about 0.5%. We have found that when the temperature of the prills is reduced at the inlet end of the drier and then increased progressively towards a maximum temperature as they move towards the outlet end of the drier, the prill structure remains stronger than when the prills are introduced directly into the high temperature. The inlet end of the drier may be cooled by introducing cold air thereinto.

The prills discharged from the first drier are divided, a portion being recirculated to be mixed with the wet prills fed into the initial drying stage and the remainder being passed to a final drying stage wherein they are passed countercurrently to a stream of cool, relatively dry air. The moisture content of the prills during their passage through the final drying stage is reduced to less than 0.5% and preferably to less than 0.2% and the temperature is reduced from about 70° C. to atmospheric temperature.

On the completion of the drying operation the prills may be screened to separate out any fines and then are bagged ready for use. Normally the amount of fines in the product is so small as to make screening unnecessary.

The drying medium discharged from the driers is preferably passed through dust collectors for the recovery of any solids entrained therewith. The fines recovered from the dust collectors, and the oversize and undersize from the screening operation, may be returned to the system for resolution and inclusion in the feed solution to the spray tower.

The following table illustrates an average of operating conditions over a period of operation of the process on a commercial scale:

| | |
|---|---|
| Saturation temperature of the feed solution to the spray tower °C | 123 |
| Temperature of feed solution to spray tower °C | 132 |
| Moisture content of solution to spray tower per cent $H_2O$ | 4.65 |
| Temperature of air fed into the base of the tower °C | 10 |
| Humidity of air fed into the base of the tower per cent | 42 |
| Temperature of exit air from tower °C | 16 |
| Temperature of prills at the base of the tower °C | 56 |
| Moisture content of prills at the base of the tower per cent $H_2O$ | 4 |
| Temperature of wet prills fed to initial drying stage °C | 55 |
| Temperature of dried prills recirculated to initial drying stage °C | 70 |
| Constitution of charge to initial drying stage: | |
| Wet prills per cent | 50 |
| Dried prills do | 50 |
| Temperature of heated air fed into initial drier °C | 116 |
| Temperature of air evacuated from initial drier °C | 52 |
| Temperature of prills leaving initial drier °C | 70 |
| Moisture content of prills leaving initial drier Per cent $H_2O$ | 0.63 |
| Temperature of air fed into second drier °C | 30 |
| Temperature of air evacuated from the second drier °C | 54 |
| Temperature of prills discharged from the second drier °C | 37 |
| Size of nozzle openings internal diameter | $\frac{5}{32}''$ |
| Moisture content of prills discharged from the second drier Per cent $H_2O$ | 0.14 |
| Screen size of salt: | |
| +10 mesh percent | 18 |
| +14 mesh do | 45.8 |
| +20 mesh do | 26.1 |
| +28 mesh do | 7.3 |
| −28 mesh do | 2.7 |

We have found that ammonium nitrate prills formed by the above described process are ideally adapted for use as a fertilizer. They are of a size and shape suitable for ready application to the soil. Their dense, hard physical structure and low moisture content are such that, when suitably conditioned with the usual coating and dusting agents, the prills can be stored for relatively long periods of time without caking. In addition, the method of drying during which the prills are constantly rotated, imparts a dense, hard surface to the prills which greatly reduces hygroscopicity.

It is found further that prills formed and dried under the conditions described herein have a crushing strength about twice that of hollow prills which are formed by spraying fused ammonium nitrate.

It will be understood, of course, that modifications can be made in the preferred embodiment of the process hereinabove described without departing from the scope of the invention as defined in the appended claims.

What we claim as new and desire to protect by Letters Patent of the United States is:

1. A process for the production of ammonium nitrate in granular form which comprises spraying, at a temperature above its saturation temperature, an aqueous ammonium nitrate solution having a saturation temperature within the range of from 115° C. to 135° C., into a gaseous cooling medium maintained at a lower temperature, whereby the outer surface of each individual droplet is suddenly chilled and crystallizes in the form of a shell, cooling the granules to a temperature below 84° C. in the gaseous cooling medium, removing the granules from the spraying step of the process and drying the granules in a heated gaseous drying medium to remove the major portion of the moisture content of the granules, and thereafter cooling and drying the granules in a cooler gaseous drying medium to reduce the moisture content of the granules to less than 0.5%.

2. A process for the production of ammonium nitrate in granular form which comprises spraying, at a temperature at least five centigrade degrees above its saturation temperature, an aqueous ammonium nitrate solution having a saturation temperature within the range of from 115° C. to 135° C., into a gaseous cooling medium at approximately atmospheric temperature, whereby the outer surface of each individual droplet is suddenly chilled and crystallizes in the form of a shell, cooling the granules to a temperature below 84° C. in the gaseous cooling medium, removing the granules from the spraying step of the process and drying the granules in a heated gaseous drying medium to remove the major portion of the moisture content, and thereafter cooling and drying the granules in a cooler gaseous drying medium to reduce the moisture content of the granules to less than 0.5%.

3. A process for the production of ammonium nitrate in granular form which comprises spraying, at a temperature above its saturation temperature, an aqueous ammonium nitrate solution having a saturation temperature within the range of from 115° C. to 135° C., into a gaseous cooling medium maintained at a lower temperature whereby the outer surface of each individual droplet is suddenly chilled and crystallizes in the form of a shell, cooling the granules to a temperature below 84° C. in the gaseous cooling medium, removing the granules from the spraying step of the process and passing them to a drying stage, cooling the granules to a temperature below that at which they were removed from the spraying step, and progressively heating them to a temperature not exceeding approximately 70° C. until the moisture content has been reduced to less than 1.0%, and drying and cooling the granules until the moisture content has been reduced to less than 0.5% and the temperature has been reduced to approximately atmospheric temperature.

4. A process for the production of ammonium nitrate in granular form which comprises spraying, at a temperature above its saturation temperature, an aqueous ammonium nitrate solution having a saturation temperature within the range of from 115° C. to 135° C., into a gaseous cooling medium maintained at a lower temperature whereby the outer surface of each individual droplet is suddenly chilled and crystallizes in the form of a shell, cooling the granules to a temperature below 84° C. in the gaseous cooling medium, removing the granules from the spraying step of the process and passing them to a drying stage, cooling the granules to a temperature not exceeding approximately 50° C. and then progressively heating them to a temperature not exceeding approximately 70° C. until the moisture content has been reduced to less than 1.0% and drying and cooling the granules until the moisture content has been reduced to less than 0.5% and the temperature has been reduced to approximately atmospheric temperature.

5. A process for the production of ammonium nitrate in granular form which comprises spraying, at a temperature above its saturation temperature, an aqueous ammonium nitrate solution having a saturation temperature within the range of from 115° C. to 135° C., into a gaseous cooling medium maintained at a lower temperature, whereby the outer surface of each individual droplet is suddenly chilled and crystallizes in the form of a shell, cooling the granules to a temperature below 84° C. in the gaseous cooling medium, removing the granules from the spraying step of the process and adding dried granules from the subsequent drying step in amount sufficient to form a mixture containing not more than about 2% moisture, passing the granules to a drying stage and heating them in progressive stages to a temperature not exceeding approximately 70° C. until the moisture content is reduced to not more than about 1.0%, cooling the granules in contact with a cooler gaseous drying medium until the moisture content has been reduced to less than 0.5% and the temperature to approximately atmospheric temperature, and recirculating a portion of the dried granules from the drying stage for adding to the granules from the spraying step.

6. A process for the production of ammonium nitrate in granular form which comprises spraying, at a temperature above its saturation temperature, an aqueous ammonium nitrate solution having a saturation temperature within the range of from 115° C. to 135° C., into a gaseous cooling medium maintained at a lower temperature, whereby the outer surface of each individual droplet is suddenly chilled and crystallizes in the form of a shell, cooling the granules to a temperature below 84° C. in the gaseous cooling medium, removing the granules from the spraying step of the process, passing the granules to a drying stage, cooling the granules and then heating them in progressive stages to a temperature not exceeding approximately 70° C. until the moisture content is reduced to not more than about 1.0%, cooling the granules in contact with a cooler gaseous drying medium until the moisture content has been reduced to less than 0.5% and the temperature to approximately atmospheric temperature, and recirculating a portion of the dried granules from the drying stage for adding to the granules from the spraying step.

7. A process for the production of ammonium nitrate in granular form which comprises spraying, at a temperature above its saturation temperature, an aqueous ammonium nitrate solution having a saturation temperature within the range of from 115° C. to 135° C., into a gaseous cooling medium maintained at a lower temperature, whereby the outer surface of each individual droplet is suddenly chilled and crystallizes in the form of a shell, cooling the granules to a temperature below 84° C. in the gaseous cooling medium, removing the granules from the spraying step of the process and passing them to a drying stage, continuously cooling and drying the granules in contact with a gaseous drying medium until the temperature has been reduced to about 50° C. and the moisture content has been reduced to about 2%, and heating the granules in contact with a gaseous drying medium to a temperature not exceeding approximately 70° C. until the moisture content has been reduced to less than 0.5%.

8. A process for the production of ammonium nitrate in granular form which comprises spraying, at a temperature above its saturation temperature, an aqueous ammonium nitrate solution having a saturation temperature within the range of from 120° C. to 125° C., into a gaseous cooling medium maintained at a lower temperature, whereby the outer surface of each individual droplet is suddenly chilled and crystallizes in the form of a shell, cooling the granules to a temperature below 84° C. in the gaseous cooling medium, removing the granules from the spraying step of the process and adding dried granules from the subsequent drying step in amount sufficient to form a mixture containing not more than about 2% moisture, continuously passing the granules as they settle from the spraying operation to a drying stage and heating them in progressive stages to a temperature not exceeding approximately 70° C. until the moisture content is reduced to not more than about 1.0%, cooling the granules in contact with a cooler gaseous drying medium until the moisture content has been reduced to less than 0.5% and the temperature to approximately atmospheric temperature, and recirculating a portion of the dried granules from the drying stage for adding to the granules from the spraying stage.

LLOYD WILLIAMS.
L. F. WRIGHT.
R. HENDRICKS.